June 3, 1969 G. GREGER 3,447,249

ELECTRONIC BUILDING SET

Filed May 5, 1966 Sheet 1 of 4

INVENTOR
GEORG GREGER

By
OSTROLENK, FABER, GERB & SOFFEN
ATTORNEYS

INVENTOR
GEORG GREGER
BY
OSTROLENK, FABER, GERB & SOFFEN
ATTORNEYS

INVENTOR
GEORG GREGER
By
OSTROLENK, FABER, GERB & SOFFEN
ATTORNEYS

INVENTOR
GEORG GREGER

By
OSTROLENK, FABER, GERB & SOFFEN
ATTORNEYS

United States Patent Office 3,447,249
Patented June 3, 1969

3,447,249
ELECTRONIC BUILDING SET
Georg Greger, Munich, Germany, assignor to Intertrading Corporation Establishment, Vaduz, Liechtenstein
Filed May 5, 1966, Ser. No. 547,999
Claims priority, application Germany, May 7, 1965, J 28,087
Int. Cl. G09b 23/06, 23/18
U.S. Cl. 35—19 17 Claims

ABSTRACT OF THE DISCLOSURE

An electronic building set is constructed such that the circuit components and line connections are housed in building bricks. The building bricks each have at least two faces having a permanent magnet and a contact plate associated with each of such faces in such manner that when two bricks are placed together in a circuit, the necessary contact pressure between the contact plates of the two bricks is produced by magnetic attraction.

Figure 1:
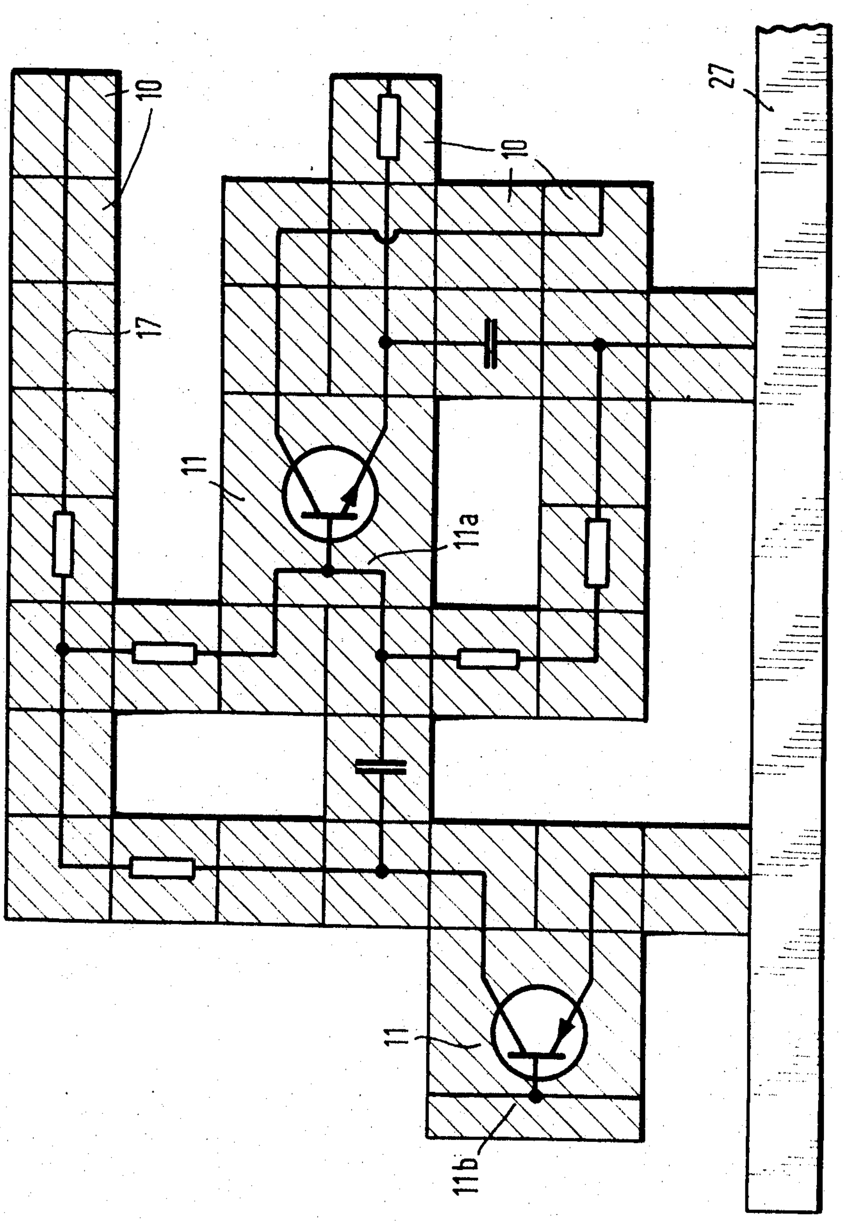

The invention relates to an electronic building set comprising electronic (electrical) circuit components which may be connected together without soldering to form any desired circuit arrangement.

Experimental sets of this type are known in various forms and enable for example radio receivers, electroacoustic apparatus, communications apparatus, electronic signalling apparatus or electronic measuring apparatus, to be built without soldering following given circuit diagrams. Generally plug-type connections are used and give a loose circuit arrangement in which the individual circuit connections and the current path are relatively difficult to follow and compare, especially in comparison with a circuit diagram drawn in the standard manner. A further disadvantage of such experimental sets is that the individual circuit components are provided with relatively long connecting wires and there is a consequent danger of short-circuits due to contact between uninsulated sections, which are not easy to trace. There is also the danger that frequency use will result in breakage of the connecting wires on the circuit components, rendering the latter unusable.

The object of the invention is to obviate these disadvantages and to provide an electronic experimental set with which clear circuits in the form given by the circuit diagrams may be constructed and checked. For this purpose, an electronic building set of the aforementioned type is constructed in such a manner that the circuit components and line connections are housed in building bricks which comprise in at least two faces a permanent magnet and a contact plate in such a manner that when two bricks are placed together the necessary contact pressure between the contact plates of said two bricks is produced by magnetic attraction. These bricks may be put together to form electric circuits rapidly in the manner of dominoes, contact being established magnetically at the same time. As in electrical circuit diagrams drawn in the standard manner, clear straight connection lines may be provided in a circuit constructed from building bricks. Rectangular bricks are to be preferred for circuit construction, but the invention is also intended to cover the use of bricks of other polygonal shape to enable inclined circuit connections to be formed.

According to a preferred embodiment of the invention, the bricks are square with a side length of for example 20 mm. each brick containing a circuit component, for example, a resistor, capacitor, coil, or circuit connection section, line intersections, or a line branch. In the case of circuit components which require a relatively large space, bricks are preferably employed whose sides have a length which is an integral multiple of the length of a side of a basic brick.

According to an advantageous further development of the invention, an electrically conductive metal plate may be provided on which the bricks, which are then provided with another permanent magnet at their base, may be held by magnetic force. The base plate may for example represent the earth potential and bricks may be provided which effect a contact from an end-face contact element to a contact element arranged in the base, this second contact element then providing a connection with the metal base plate. The circuit is made especially clear if according to a further development of the invention the circuit symbols of the individual circuit components which the bricks contain and the connecting lines extending to the end faces are marked on the individual bricks. When a circuit has been assembled a circuit diagram is then obtained which corresponds in every detail to the standard circuit diagrams.

Some examples of embodiment are described below with reference to the drawings, wherein:

FIG. 1 shows a circuit put together from building bricks according to the invention in the manner of dominoes.

Figure 2:
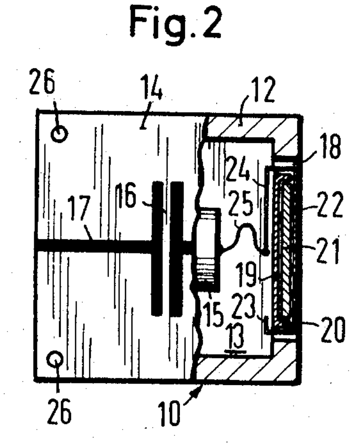
Figure 3:
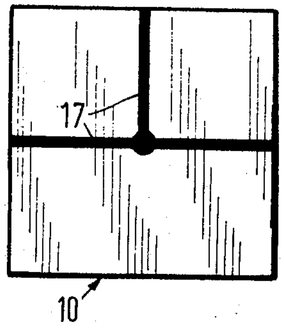
Figure 4:
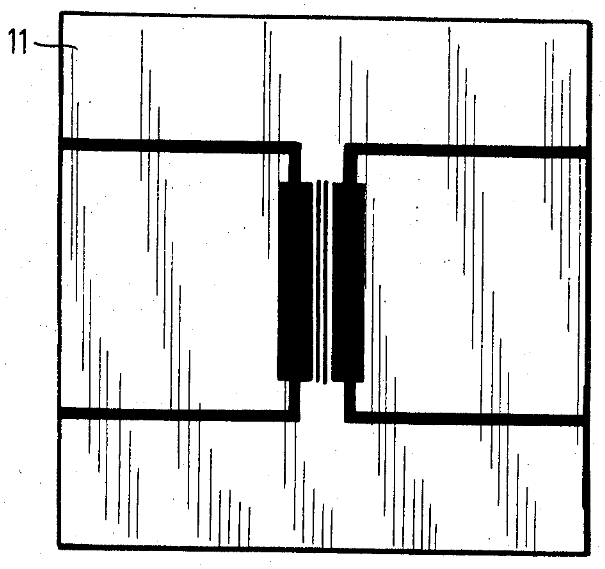
Figure 5:
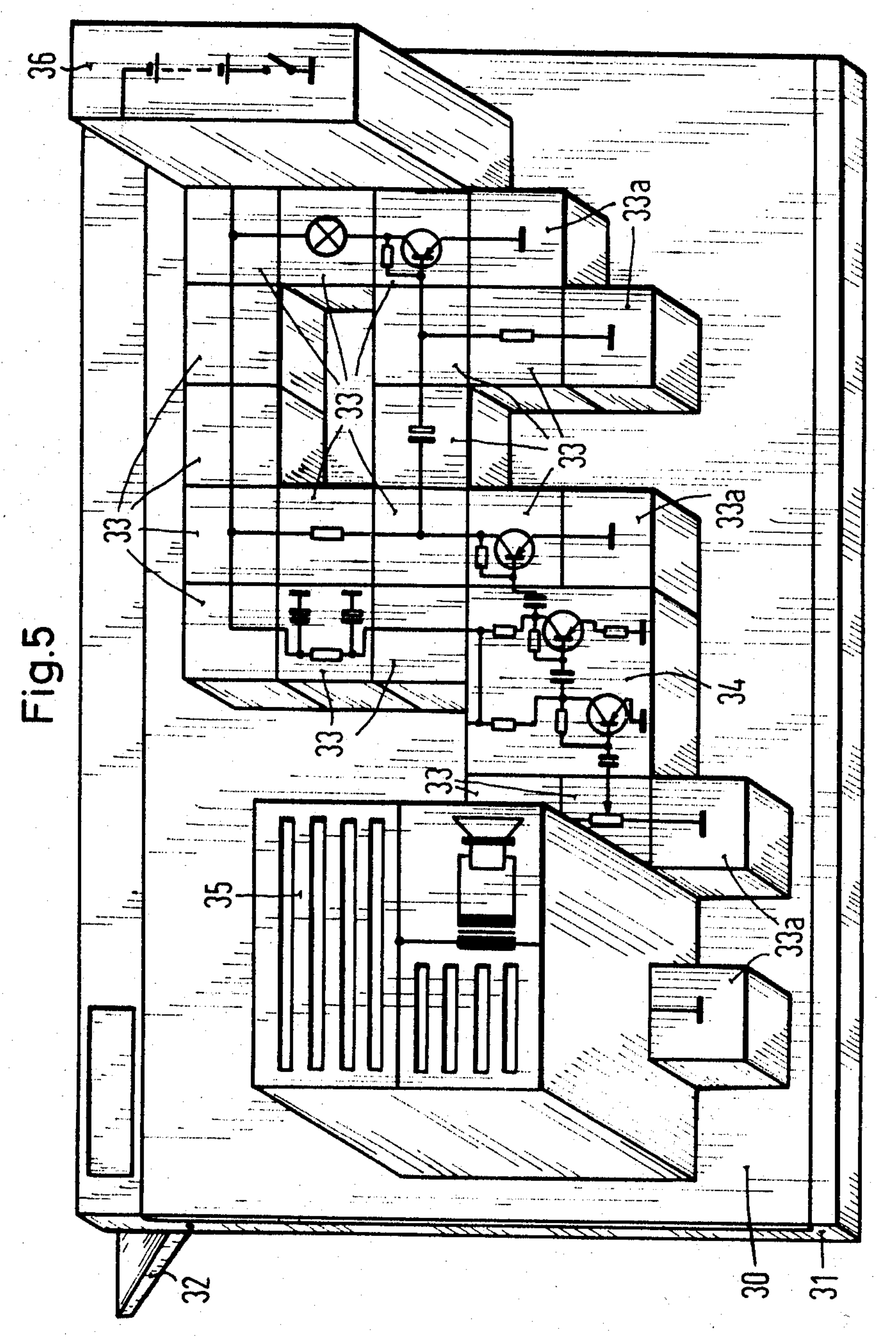
Figure 6:
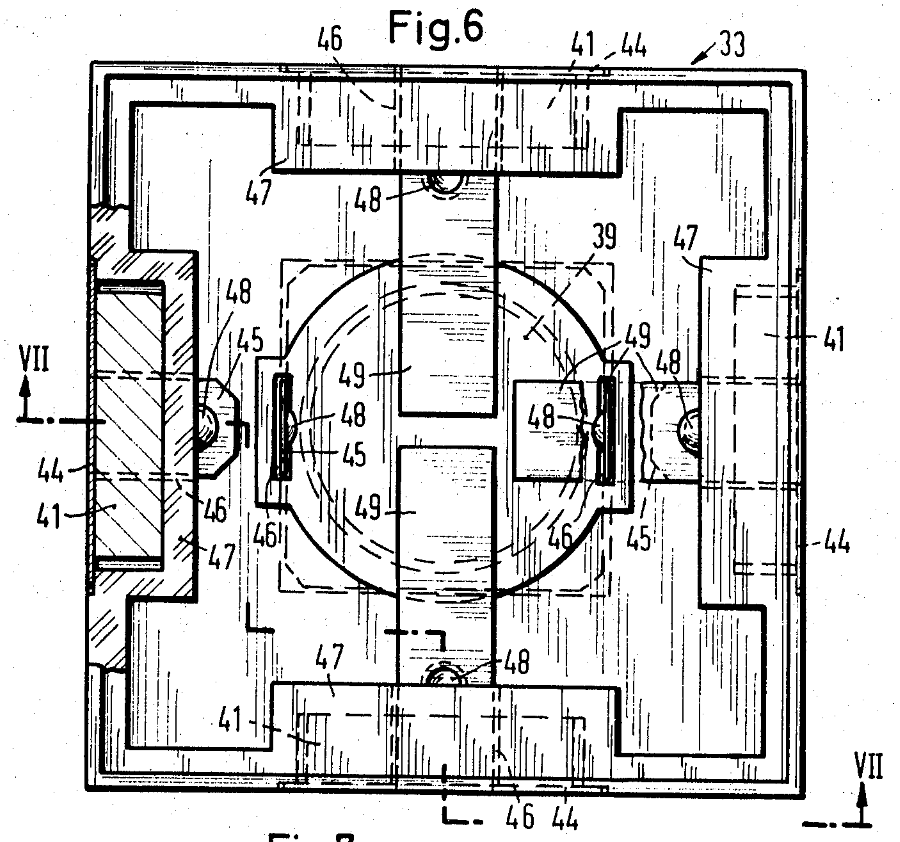
Figure 7:
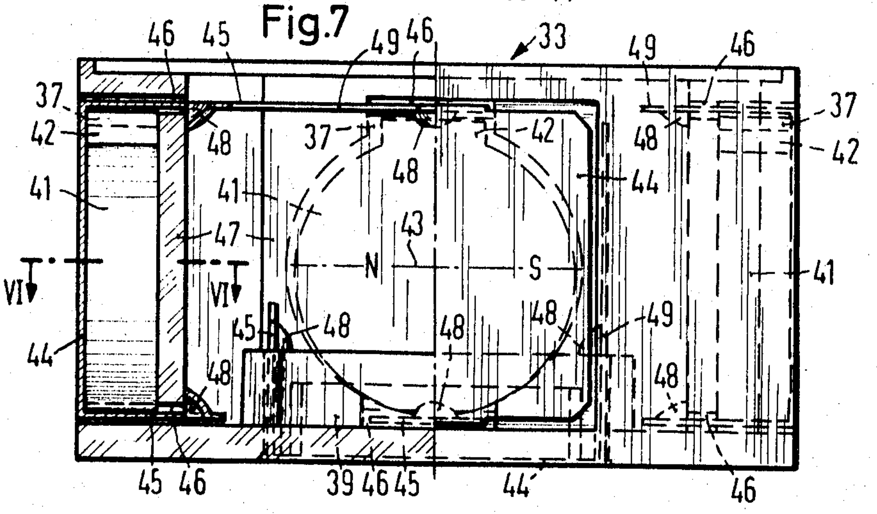

FIG. 2 is a partially sectional view of an individual brick having a circuit component in the form of a capacitor, FIG. 3 is a view of an individual brick containing a line branch, FIG. 4 shows an individual brick having a transformer as circuit component, FIG. 5 is a perspective view of a circuit built upon on a base plate, FIG. 6 is a section of an individual brick of another embodiment along the line VI–VI of FIG. 7, FIG. 7 is a section along the line VII–VII of FIG. 6.

The circuit in FIG. 1 is put together from individual bricks 10 and 11, the bricks 10 of square form forming the basic components and the bricks 11, the circuit component of which is for example a transistor, having an area which is an integral multiple—four in the example of embodiment—of the area of the basic components 10. Bus bars 27 may be provided which connect together components at the same potential (e.g. earth).

The construction of the bricks used in the circuit of FIG. 1 is shown in FIG. 2. They consist of a frame 12 forming the end faces, a base 13 and a cover 14. The frame 12 may be made, for example from plastic material, integral with either the base 13 or the cover 14 and the cover 14 or the base 13 stuck on subsequently. The space enclosed by the frame 12 houses the circuit component 15, which in FIG. 2 is constructed as a capacitor. The cover 14 carries the circuit symbol 16 of the circuit component within the frame 12, the circuit lines 17 ending in the centre of one side of the square so that they continue on a brick placed adjacent in the manner of a domino. At least one of the end faces of the frame at which a circuit line 17 ends is provided with a recess 18 in which is secured a disc-shaped support 19 having a circular peripheral flange 20 which houses a circular magnet 21. Said magnet 21 is freely rotatable in the support; the ease of rotation of the magnet 21 may be increased by making the face thereof which bears against the support 19 convex.

The magnetic axis of the magnet 21 extends along a diameter of the magnet, i.e. perpendicular to the circuit line 17.

The support 19, which is open towards the outside, is covered by a contact plate 22 of non-ferromagnetic material, the bent end 23 of which bears behind the support 19 and the other end 24 of which extends inwardly to the centre of the support 19 and is connected by a line section 25 to the circuit component 16.

If the end faces of two bricks comprising the magnetic contact arrangement of FIG. 2 are placed together, the magnets 21 set themselves with their unlike poles facing each other, i.e. they attract each other and thus press the contact plates lying between them together with the necessary contact pressure. Since no plug contact is required, individual bricks may be removed or introduced from above, for which purpose key holes 26 may be provided in the cover.

In the case of circuit components whose symbol requires two parallel line extensions on one side, or in the case of circuit components such as loud speakers, switch stages, batteries, instruments, etc., which cannot be housed in a basic brick, large bricks 11 are employed whose dimensions consist of an integral multiple of the length of the side of a basic brick 10. In the circuit in FIG. 1, bricks 11 for transistors are illustrated. The base may extend either to the left, as shown at 11*a*, or may extend out upwardly or downwardly, the ends of the lines in each case meeting the end faces at points which are a distance from the edge equal to half the length of the side of the basic brick 10.

FIG. 4 shows an individual brick with several circuit lines leading to one side and housing a transformer circuit component. The length of the sides of this brick is twice that of the basic brick 10; it is also square. Instead of a single circuit component, a brick of correspondingly larger dimensions may also contain circuit groups or stages, for example an amplifier stage. The individual bricks may also contain adjustable resistances, switches, potentiometers and the like, and carry an adjusting knob, preferably projecting upwardly. Furthermore, bricks may be provided for the insertion of batteries, as well as bricks comprising bulbs or sockets therefor. Other components, such as loud speakers or the like, may also be arranged in bricks of this type.

Finally, individual bricks may be provided which comprise connecting terminals and possibly also plug connections for connection to an external current source or to other apparatus, such as a loud speaker, sound pick-up, magnetic head, or the like.

Among other circuit components which can be arranged in a brick are photoconductive or photovoltaic cells, electron valves or tubes, gas-discharge vessels, and rectifier elements or assembled rectifiers, particularly dry rectifiers—in short all components which might be used in an electric circuit. In some cases it will be possible to place the bricks containing the active or passive circuit components directly together, but generally the interposition of line sections will be necessary and for this reason the invention provides bricks with line sections as shown by FIGS. 1 and 3, which include straight through lines, branch lines, intersections, and intersections which are not connected together electrically.

To ensure that the end faces of the individual bricks bear flat against each other leaving no gap, it is preferable to anchor the contact plate fixedly in the face without play so that it projects beyond the face only by an amount sufficient to ensure contact is made, for example 0.05 mm. In order to obtain a measuring point at any desired point of the circuit, contact plates may be provided with connecting wires which are adapted to be clamped between any two bricks and magnetically secured.

FIG. 5 shows as example a perspective view of a circuit of an acoustic warning device with indicating light, which is built up on a base plate 30 consisting of ferromagnetic material. The base plate 30 is inserted in a plastic frame 31 comprising at the back collapsible supports 32. As in the circuit arrangement according to FIG. 1, square basic bricks 33 are again used; they correspond to the bricks 10 of FIG. 1 and are connected together magnetically, the magnetic connection effecting at the same time the electrical contact. In the circuit according to FIG. 5, in addition to the basic bricks 33, a brick 34 is used which is four times the size of a basic brick and which houses a circuit group. A loud-speaker brick 35 has a base area nine times that of a basic brick 33 and a height which is several times the height of the basic brick. The base area of the brick 36 containing the battery is three times that of the basic brick and this battery brick also has a greater height than said basic brick.

The bricks used in the circuit in FIG. 5 are constructed as shown in FIGS. 6 and 7. Each brick comprises dish-shaped recesses in the base and in the side walls into which the magnets 39 and 41 respectively are inserted; said recesses are covered by a contact plate 44. The purpose of the magnet 39 is firstly to hold the brick 33 on the ferromagnetic base plate 30 by means of magnetic force and secondly, in the case of circuit and line components which are to establish a contact to earth or chassis, such as the line components 33*a* in FIG. 5, to produce sufficient contact pressure between base plate and contact plate.

The arrangements of the magnets and contact plates in the bricks according to FIGS. 5 and 7 differs from that in the bricks according to FIGS. 1 to 4. Instead of the freely rotatable magnetic discs, both the magnet 39 in the base and the magnets 41 in the side walls are not rotatable, but are secured against rotation by a projection 42 in a corresponding recess 37. In the case of the magnets 41 in the side walls, the magnetic axis 43 extends parallel to the base and cover. Seen in end elevation, the polarity is in the same direction at all the side faces, i.e., for example, always N to the left and S to the right, so that when placed together a N pole always lies opposite a S pole.

The contact plates 44 are provided with connecting lugs 45 which project through the slots 46 in the walls 47. Each lug 45 comprises a barbed press-out 48. The press-out 48 of the lugs 45 bear behind the wall 47 and thus secure the contact plates 44 and the magnets.

The ends 49 of the lugs 45 are connected together in the case of line bricks, for example by spot-welding, or to the circuit component connections.

What I claim is:

1. Electronic building set comprising electronic (electrical) circuit components which may be connected together without soldering to form any desired circuit arrangement, said circuit components and line connections being housed in building bricks, said blocks each comprising in at least two faces a permanent magnet and a contact plate in such a manner than when two bricks are placed together the necessary contact pressure between the contact plates of said two bricks is produced by magnetic attraction.

2. Electronic building set as set forth in claim 1, wherein said permanent magnets are arranged in each case behind the contact plates disposed in the end faces.

3. Electronic building set as set forth in claim 1, comprising a base plate of ferromagnetic and electrically conductive material and wherein a magnet with contact plate is provided in the base of each brick.

4. Electronic building set as set forth in claim 1, wherein a ferromagnetic and electrically conductive rail is provided as line guide, on which the bricks may be held by magnetic force establishing electrical contact.

5. Electronic building set as set forth in claim 1, wherein square basic bricks and large bricks are employed, the area of the large bricks being an integral multiple of the area of the basic bricks.

6. Electronic building set as set forth in claim 5, wherein the magnets are arranged in each case in the end faces of the basic bricks and in the large bricks each contact plate is at a distance from the corner equal to half the length of a side of the basic brick or an integral multiple thereof.

7. Electronic building set as set forth in claim 6, wherein the magnetic axis of the permanent magnet extends parallel to the end face of the brick into which the magnet is recessed.

8. Electronic building set as set forth in claim 7, wherein the magnets are round and are rotatable in a recess in the end face behind the contact plate about an axis perpendicular to the plane of said face.

9. Electronic building set as set forth in claim 7, wherein the magnets are mounted non-rotatably in a recess behind the contact plate in such a manner that their magnetic axis extends parallel to the base and cover and seen in and elevation the polarity of all magnets is the same.

10. Electronic building set as set forth in claim 8, wherein the contact plates comprise two connecting lugs which pass through slots in the end face or base into the inside of the brick and are connected therein to the electrical circuit components or lines.

11. Electronic building set as set forth in claim 10, wherein the lugs within the brick are bent behind the end face.

12. Electronic building set as set forth in claim 10, wherein the lugs are provided with barbed press-outs which allow insertion through the slots but prevent a withdrawal therefrom.

13. Electronic building set as set forth in claim 12, wherein the bricks consist of a frame which is made from plastic and integrally with the base.

14. Electronic building set as set forth in claim 13, wherein the symbol for the circuit component contained in the brick and the line connections are marked on the cover.

15. Electronic building set as set forth in claim 14, wherein the base and side walls of the brick are transparent.

16. Electronic building set as set forth in claim 14, comprising bricks with adjusting members.

17. Electronic building set as set forth in claim 1, wherein contact plates comprising connection wires are provided, said wires being adapted to be clamped and magnetically secured between any two bricks and to establish contact with the line connections of the adjacent bricks.

References Cited

UNITED STATES PATENTS

| | | | |
|---|---|---|---|
| 2,166,036 | 7/1939 | Bertoye | 40—42 X |
| 2,795,893 | 6/1957 | Vayo | 46—241 X |
| 3,144,527 | 8/1964 | Tolegian | 339—12 X |

EUGENE R. CAPOZIO, *Primary Examiner.*

H. S. SKOGQUIST, *Assistant Examiner.*

U.S. Cl. X.R.

40—142; 46—16, 241; 335—205; 339—12